（12) United States Patent
Arinobu

(10) Patent No.: US 9,485,387 B2
(45) Date of Patent: Nov. 1, 2016

(54) ICON ARRANGEMENT DRAWING CREATION SYSTEM

(71) Applicant: KYOCERA Document Solutions Inc., Osaka-shi, Osaka (JP)

(72) Inventor: Ryota Arinobu, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/868,240

(22) Filed: Sep. 28, 2015

(65) Prior Publication Data

US 2016/0092101 A1 Mar. 31, 2016

(30) Foreign Application Priority Data

Sep. 30, 2014 (JP) .................. 2014-200129

(51) Int. Cl.
| | | |
|---|---|---|
| G06F 15/00 | (2006.01) | |
| G06F 3/12 | (2006.01) | |
| G06K 1/00 | (2006.01) | |
| H04N 1/32 | (2006.01) | |
| G06F 3/0481 | (2013.01) | |
| G06Q 10/06 | (2012.01) | |

(52) U.S. Cl.
CPC ...... *H04N 1/32101* (2013.01); *G06F 3/04817* (2013.01); *G06F 3/12* (2013.01); *G06Q 10/0631* (2013.01); *H04N 2201/0094* (2013.01)

(58) Field of Classification Search
CPC .. G06F 3/1296; G06F 3/1297; G06F 3/1293; G06F 3/04817; G06F 3/12; H04N 1/00204; H04N 1/32101; H04N 2201/0094; G06K 15/00

USPC ................ 358/1.1, 1.15, 1.13, 1.14
See application file for complete search history.

(56) References Cited

U.S. PATENT DOCUMENTS

| | | | | |
|---|---|---|---|---|
| 8,379,986 B2* | 2/2013 | Tsurumi | .................. | A63F 13/10 345/156 |
| 8,812,230 B2* | 8/2014 | Yamamoto | ............. | G01C 21/26 701/451 |
| 2006/0224714 A1 | 10/2006 | Ohara et al. | | |
| 2014/0033095 A1* | 1/2014 | Koba | .................... | G06F 3/0488 715/765 |

FOREIGN PATENT DOCUMENTS

| | | |
|---|---|---|
| JP | 2006277602 A | 10/2006 |
| JP | 2007109213 A | 4/2007 |

* cited by examiner

*Primary Examiner* — Douglas Tran
(74) *Attorney, Agent, or Firm* — Alleman Hall McCoy Russell & Tuttle LLP

(57) ABSTRACT

An arrangement drawing creation system includes: a portable apparatus carried by an arrangement drawing creator; and a server. The portable apparatus includes: a first communication processing portion communicates with the server and a target apparatus; an acquisition processing portion acquires a device ID from the target apparatus; a generation processing portion generates a device icon; a display processing portion displays the generated device icon and a layout drawing; an operation input processing portion accepts an instruction of moving a position of the device icon; and a registration processing portion registers the changed position of the device icon in the server. The server includes: a second communication processing portion communicates with the portable apparatus; and a storage portion stores the layout drawing and the arrangement drawing.

6 Claims, 9 Drawing Sheets

ICON ARRANGEMENT DRAWING CREATION SYSTEM

INCORPORATION BY REFERENCE

This application is based upon and claims the benefit of priority from the corresponding Japanese Patent Application No. 2014-200129 filed on Sep. 30, 2014, the entire contents of which are incorporated herein by reference.

BACKGROUND

The present disclosure relates to an arrangement drawing creation system, an arrangement drawing creation apparatus, and a non-transitory computer-readable storage medium having an arrangement drawing creation program stored therein, which create an arrangement drawing of an apparatus and the like disposed on a floor of an office or the like.

When a manager manages apparatuses such as many multifunction peripherals (MFPs) and personal computers (PCs) introduced on a floor in an office or the like, it is important for the manager to recognize arrangement locations of the apparatuses on the floor.

In the case of a large scale in which the number of apparatuses is several hundreds or more, in order to appropriately recognize the position of each apparatus, a manager has created an arrangement drawing of the apparatuses and the like to recognize the arrangement locations of each apparatus and the like. Various modifications for easily creating such an arrangement drawing have been made.

In a typical technique, apparatus objects representing apparatuses such as a printer are displayed on a layout drawing of a floor and are connected to each other by connection objects (lines) based on data of connection between the apparatus objects. To a printer object, information indicating by which PC the printer is designated as a default printer is added.

In the above typical technique, a state of the printer is displayed by changing a display form of the displayed printer object. In addition, a position, on the layout drawing, at which the printer object or the like is disposed, is adjusted by a user performing a drag operation or the like with respect to the printer object on a client PC.

SUMMARY

An arrangement drawing creation system according to an aspect of the present disclosure includes a portable apparatus carried by an arrangement drawing creator and a server capable of communicating with the portable apparatus by wireless.

The portable apparatus includes a first communication processing portion, an acquisition processing portion, an icon generation processing portion, a display processing portion, an operation input processing portion, and a first icon position registration processing portion. The first communication processing portion performs a communication process with the server and a target apparatus whose installation position is to be described in a specific area on an arrangement drawing. The acquisition processing portion performs a process of acquiring, from the target apparatus via the first communication processing portion, a device ID with which the target apparatus is uniquely identified. The icon generation processing portion performs a process of generating a device icon having the acquired device ID. The display processing portion performs a process of displaying the generated device icon such that the device icon is superimposed on a layout drawing of an already-existing object, the layout drawing being acquired from the server. The operation input processing portion performs a process of accepting, from the arrangement drawing creator, an instruction of moving a position of the device icon on the displayed layout drawing. The first icon position registration processing portion performs a process of changing the position of the device icon on the layout drawing based on the accepted instruction, and performs a process of issuing an instruction of registering the changed position of the device icon in the server.

The server includes a second communication processing portion, a storage portion, and a second icon position registration processing portion. The second communication processing portion performs a communication process with the portable apparatus. The storage portion has a storage area for storing the layout drawing and the arrangement drawing. The second icon position registration processing portion performs a process of registering the changed position of the device icon in the arrangement drawing, based on the instruction from the first icon position registration processing portion of the portable apparatus.

An arrangement drawing creation apparatus according to an aspect of the present disclosure is an arrangement drawing creation apparatus carried by an arrangement drawing creator. The arrangement drawing creation apparatus includes a communication processing portion, a storage portion, an acquisition processing portion, an icon generation processing portion, a display processing portion, an operation input processing portion, and an icon position registration processing portion. The communication processing portion performs a communication process with a target apparatus whose installation position is to be described in a specific area on an arrangement drawing. The storage portion has a storage area for storing a layout drawing of an already-existing object and the arrangement drawing. The acquisition processing portion performs a process of acquiring, from the target apparatus via the communication processing portion, a device ID with which the target apparatus is uniquely identified. The icon generation processing portion performs a process of generating a device icon having the acquired device ID. The display processing portion performs a process of displaying the generated device icon such that the device icon is superimposed on the layout drawing. The operation input processing portion performs a process of accepting, from the arrangement drawing creator, an instruction of moving a position of the device icon on the displayed layout drawing. The icon position registration processing portion performs a process of changing the position of the device icon on the layout drawing based on the accepted instruction, and performs a process of registering the changed position of the device icon in the arrangement drawing.

A non-transitory computer-readable storage medium according to another aspect of the present disclosure has stored therein an arrangement drawing creation program executable by a computer of a portable apparatus carried by an arrangement drawing creator. The arrangement drawing creation program causes the computer to execute: a procedure of acquiring, from a target apparatus whose installation position is to be described in a specific area on an arrangement drawing, via a first communication processing portion, a device ID with which the target apparatus is uniquely identified; a procedure of generating a device icon having the acquired device ID; a procedure of displaying the generated device icon such that the device icon is superimposed on a layout drawing of an already-existing object; a procedure of accepting, from the arrangement drawing creator, an instruction of moving a position of the device icon on the displayed layout drawing; and a procedure of performing a process of changing the position of the device icon on the layout drawing, based on the accepted instruction, and issuing an instruction of registering the changed position of the device icon in a server.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the drawings.

[Outline and Overall Configuration]

Figure 1:
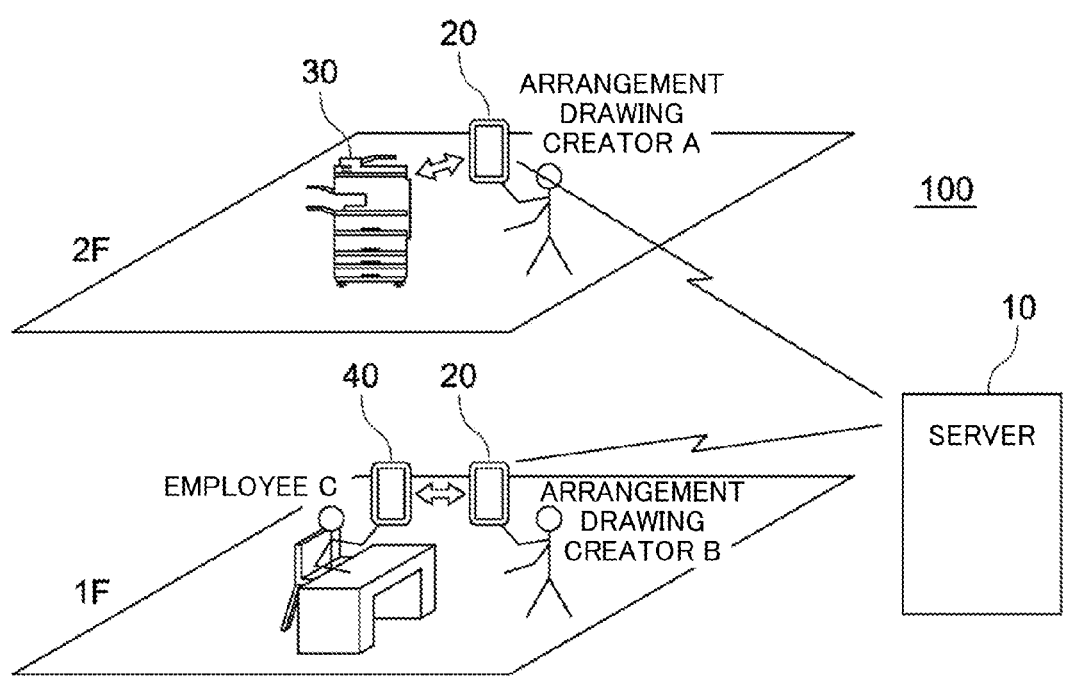
FIG. 1 shows an outline and the overall configuration of an arrangement drawing creation system 100 according to an embodiment of the present disclosure.
Figure 2:
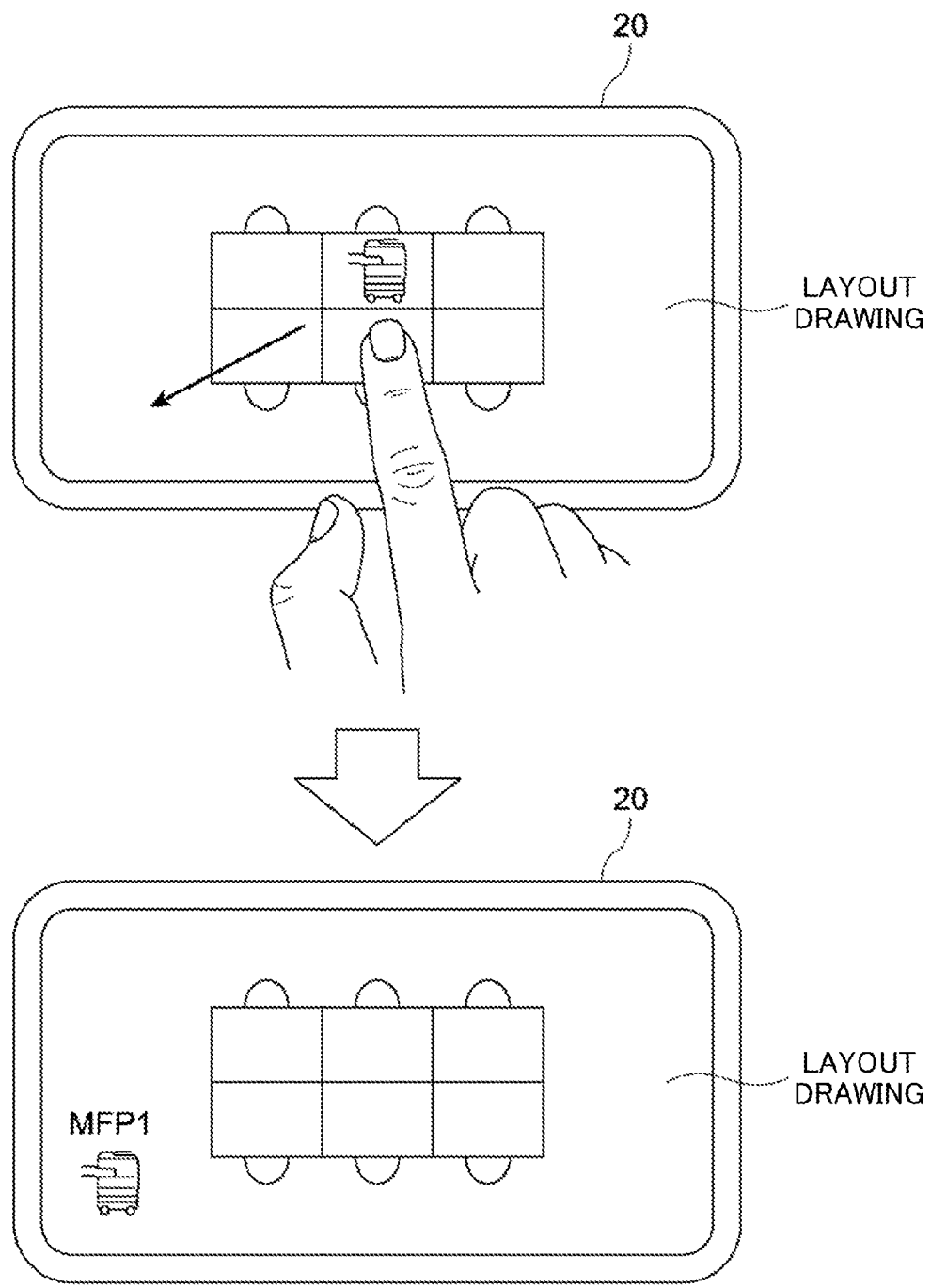
FIG. 2 shows the outline of the arrangement drawing creation system 100 according to the embodiment of the present disclosure.

First, an outline and the overall configuration of an arrangement drawing creation system according to an embodiment of the present disclosure will be described. FIGS. 1 and 2 show the outline and the overall configuration of the arrangement drawing creation system according to the embodiment of the present disclosure.

The arrangement drawing creation system 100 includes a server 10, portable apparatuses 20 used by arrangement drawing creators to create an arrangement drawing which is created by registering positions of apparatuses and employees on a layout drawing, an image forming apparatus 30 which resisters positions on the layout drawing, and an apparatus 40 of each employee whose position is registered on the layout drawing. Communication between the server 10 and each portable apparatus 20 is performed by wireless.

The state shown in FIG. 1 shows that an arrangement drawing creator A who carries the portable apparatus 20 goes around the second floor of an office and puts the portable apparatus 20 over the image forming apparatus 30 placed on the second floor to acquire a device ID of the image forming apparatus 30 via near field communication (NFC).

FIG. 1 also shows that an arrangement drawing creator B who carries another portable apparatus 20 goes around the first floor of the office and puts the portable apparatus 20 over the apparatus 40 of an employee C whose seat is on the first floor, to acquire an employee ID stored in the apparatus 40 via NFC.

Based on the acquired device ID or employee ID, each portable apparatus 20 searches for attribute data of the image forming apparatus 30 or the employee who carries the apparatus 40 which attribute data is stored in the server 10, and generates a device icon or employee icon having link information to the found attribute data.

The generated icon is displayed on a layout drawing on the portable apparatus 20. The upper diagram in FIG. 2 is a diagram showing a state where the device icon is displayed on a screen of the portable apparatus 20.

As shown in the lower diagram in FIG. 2, the arrangement drawing creator A drags the device icon, which is displayed on the layout drawing and represents the image forming apparatus 30, to a position corresponding to the actual installation location, then causes the server 10 to register this position, and creates an arrangement drawing.

In the lower diagram in FIG. 2, the device ID for identifying the apparatus corresponding to the device icon is displayed near the device icon. Instead of the device ID, a name with which a user of the arrangement drawing easily identifies the apparatus may be displayed near the device icon.

Conventionally, in order to create an arrangement drawing, an arrangement drawing creator has to perform a field research of a floor regarding arrangement of apparatuses and the like to recognize a current arrangement situation, then return to the location of a client PC, and create arrangement data according to the acquired arrangement situation. In this case, a load on the arrangement drawing creator is great. Such a problem is solved by the arrangement drawing creation system 100 according to the present embodiment.

That is, according to the above-described arrangement drawing creation system 100, the arrangement drawing creator can create an accurate arrangement drawing without taking time and effort, by going around each floor with the portable apparatus 20, acquiring an ID of an apparatus such as the image forming apparatus 30 installed thereon or an ID of an employee seated on a seat thereon, generating a corresponding icon, and moving the position of the icon on a layout drawing while viewing the actual location of the apparatus or the employee.

Each of the device icon and the employee icon has link information to attribute data stored in the server 10. Thus, by selecting a specific icon, a user of the arrangement drawing can refer to the attribute data, within the server 10, which is linked to the icon.

In the description here, a diagram in which only the shape of each floor indicating a specific area and arrangement of equipment already installed on each floor (already-existing objects) are represented is referred to as a layout drawing, and a diagram in which a device icon or an employee icon is disposed on a layout drawing is referred to as an arrangement drawing, so that these diagrams are distinguished from each other.

In the above description, NFC is used in order to acquire the device ID, but the communication is not limited thereto, and wired communication such as via a universal serial bus (USB) or another type of wireless communication may be used. A bar code indicating the device ID may be attached to the image forming apparatus 30 or the like beforehand, and may be read by a scanner provided in the portable apparatus 20.

In order to acquire the device ID of the image forming apparatus 30 or the like, the portable apparatus 20 may acquire information within a management information base (MIB) provided in the image forming apparatus 30 or the like, by a simple network management protocol (SNMP). In this configuration, the portable apparatus 20 can acquire the device ID of the image forming apparatus 30 or the like without adding a special mechanism to the image forming apparatus 30 or the like.

In the above description, in order to acquire the employee ID, NFC is performed between the apparatus 40 carried by the employee and the portable apparatus 20, but the communication is not limited thereto. An ID card carried by the employee may be a non-contact type IC card, and the employee ID may be read from the ID card by using a reader provided in the portable apparatus 20.

In the above description, the arrangement drawing creation system 100 includes the server 10 and the one or more portable apparatuses 20, but the configuration of the arrangement drawing creation system 100 is not limited thereto, and the server 10 and the portable apparatus 20 may be integrated with each other into a single portable apparatus 20' which forms an arrangement drawing creation apparatus.

In the above, the outline and the overall configuration of the arrangement drawing creation system according to the embodiment of the present disclosure have been described.

[Configuration of Server 10]

Next, the configuration of the server 10 will be described. The server 10 may be configured by dedicated hardware or software or may be configured by a computer. The configuration of the server 10 in the case where the server 10 is configured by a computer is shown in FIG. 3.

Figure 3:
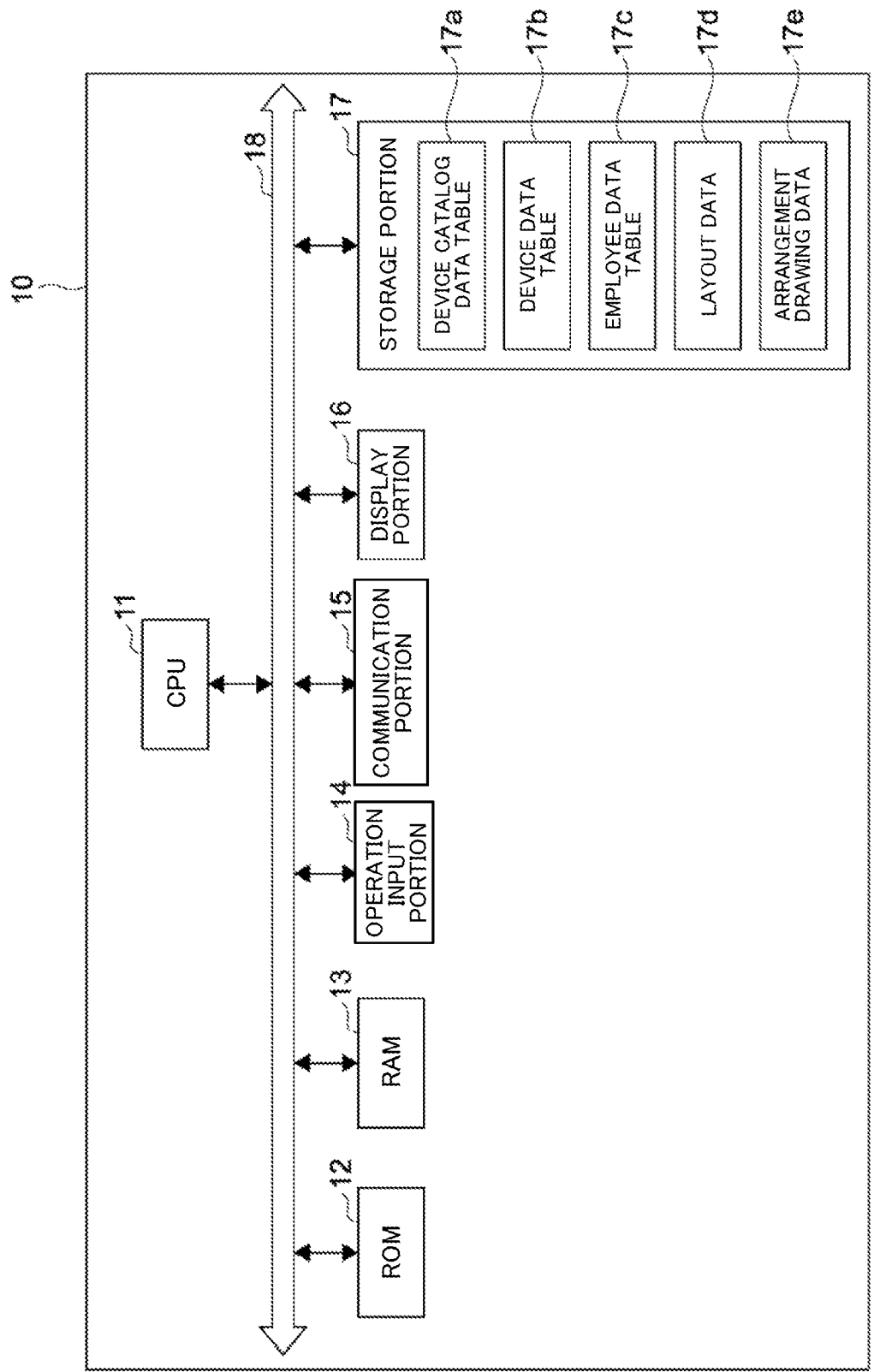
FIG. 3 shows the configuration of a server 10 as a computer.

As shown in FIG. 3, the server 10 includes a central processing unit (CPU) 11, a read only memory (ROM) 12, a random access memory (RAM) 13, an operation input portion 14, a communication portion 15, a display portion 16, and a storage portion 17, and these respective blocks are connected to each other via a bus 18.

The ROM 12 stores data and a plurality of programs such as firmware for executing various processes. The RAM 13 is used as a working area for the CPU 11 and temporarily stores an operating system (OS), currently executed various applications, and currently processed various data.

The storage portion 17 is, for example, a hard disk drive (HDD), a flash memory, or another non-volatile memory. In the storage portion 17, in addition to the OS, various applications, and various data, a device catalog data table 17a, a device data table 17b, an employee data table 17c, layout data 17d, and arrangement drawing data 17e, which will be described later, are stored.

The device catalog data table 17a is a table in which data regarding specifications of an apparatus such as the image forming apparatus 30 which is developed on the floor of the office is stored so as to be linked to a device ID.

The device data table 17b is a table in which unique attribute data other than the specifications, of the apparatus such as the image forming apparatus 30 which is developed on the floor of the office, for example, a current state of the apparatus, is stored so as to be linked to the device ID.

The employee data table 17c is a table in which an attribute of an employee whose seat is fixed in the office is stored so as to be linked to an employee ID.

The layout data 17d is electronic data for displaying the layout drawing of the office on the screen of the portable apparatus 20.

The arrangement drawing data 17e is data in which the positions of a device icon and an employee icon disposed on the layout drawing are stored.

The communication portion 15 is a communication circuit which performs a communication process of communicating information between the portable apparatus 20 and the communication portion 15.

The CPU 11 develops, into the RAM 13, a program corresponding to a command provided from the operation input portion 14, among a plurality of programs stored in the ROM 12 and the storage portion 17, and controls the display portion 16 and the storage portion 17 as appropriate based on the developed program.

The operation input portion 14 is, for example, a pointing device such as a mouse, a keyboard, a touch panel, or another operation device.

The display portion 16 includes a display control circuit, and is, for example, a liquid crystal display, an electro-luminescence (EL) display, a plasma display, a cathode ray tube (CRT) display, or the like. The display portion 16 may be included in the server 10 or may be externally connected thereto.

Figure 4:
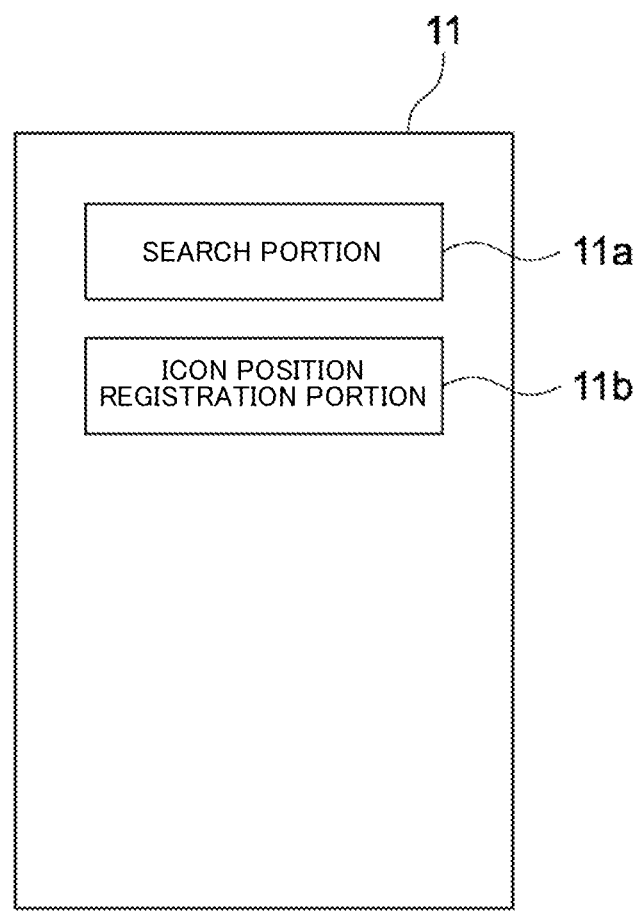
FIG. 4 shows functional blocks realized by a program being executed in a CPU 11.

Next, functional blocks realized by a program being executed in the CPU 11 will be described. FIG. 4 shows the functional blocks realized by the program being executed in the CPU 11.

The functional blocks realized in the CPU 11 of the server 10 are a search portion 11a and an icon position registration portion 11b. The search portion 11a and the icon position registration portion 11b may be realized by an electric circuit or an arithmetic unit having an electronic device incorporated therein such that a process of each portion is executable.

The search portion 11a performs a process of searching the device catalog data table 17a, the device data table 17b, or the employee data table 17c based on the device ID or employee ID acquired by the portable apparatus 20 of the arrangement drawing creator, and transmits a result of the search to the portable apparatus 20 via the communication portion 15.

The icon position registration portion 11b performs a process of acquiring information of the position of the device icon or the employee icon determined on the layout drawing by the arrangement drawing creator using the portable apparatus 20, and stores the acquired position information as the arrangement drawing data 17e into the storage portion 17.

[Configuration of Portable Apparatus 20]

Next, the configuration of the portable apparatus 20 will be described. Similarly to the server 10, the portable apparatus 20 may be configured by dedicated hardware or software or may be configured by a computer, in particular, a tablet type computer which is suitable to be carried. The configuration of the portable apparatus 20 in the case where the portable apparatus 20 is configured by a tablet type computer is shown in FIG. 5.

Figure 5:
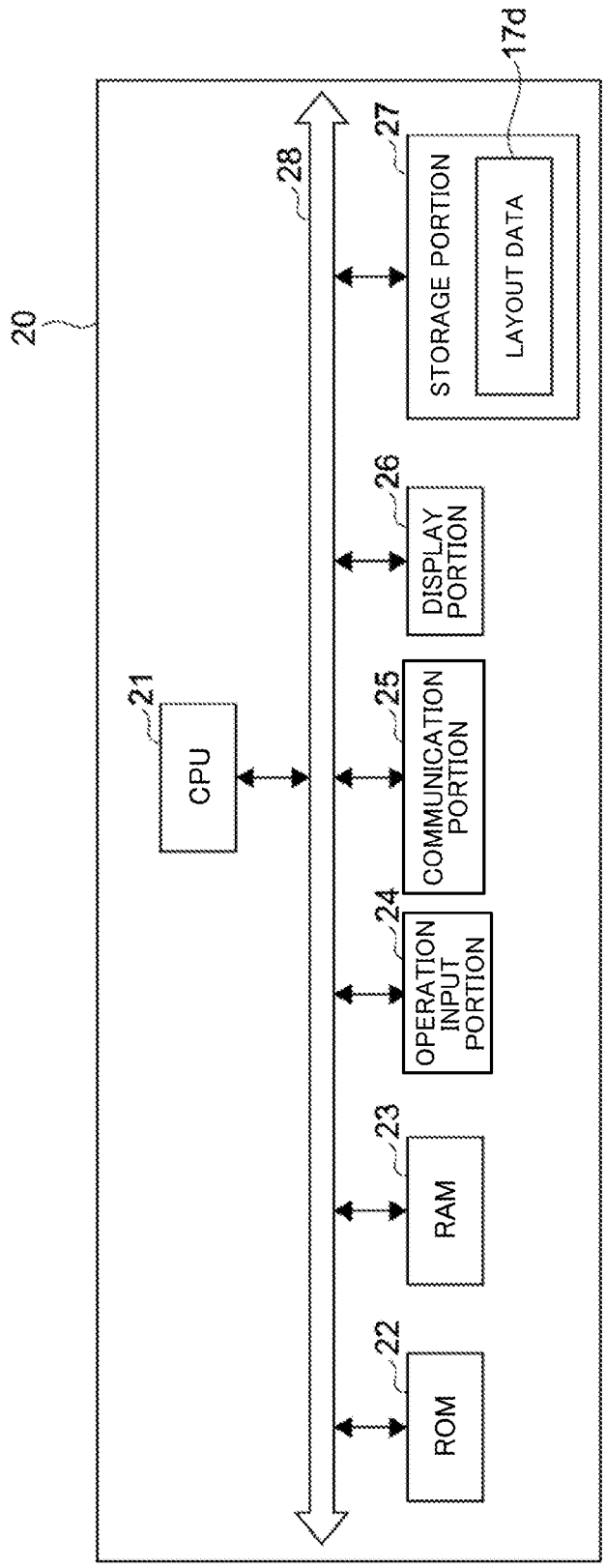
FIG. 5 shows the configuration of a portable apparatus 20 as a tablet type computer.

As shown in FIG. 5, the configuration of the portable apparatus 20 is substantially the same as the configuration of the server 10, the portable apparatus 20 includes a CPU 21, a ROM 22, a RAM 23, an operation input portion 24, a communication portion 25, a display portion 26, and a storage portion 27, and they are connected to each other via a bus 28. The description of the parts common to the server 10 is omitted.

In the storage portion 27, a copy of the layout data 17d, which is stored in the storage portion 17 of the server 10, may be stored. Because of this configuration, as compared to the configuration where the layout data 17d is acquired from the server 10 in order to display the layout drawing, a time of communication for acquiring data can be reduced, or an amount of communication can be reduced.

Figure 6:
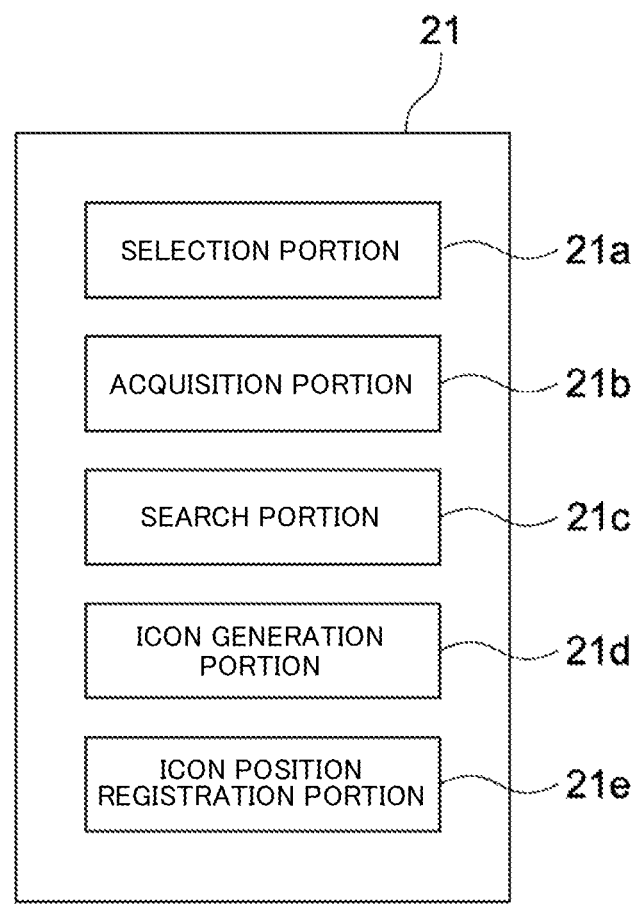
FIG. 6 shows functional blocks realized by a program being executed in a CPU 21.

Next, functional blocks realized by a program being executed in the CPU 21 will be described. FIG. 6 shows the functional blocks realized by the program being executed in the CPU 21.

The functional blocks realized in the CPU 21 of the portable apparatus 20 are a selection portion 21a, an acquisition portion 21b, a search portion 21c, an icon generation portion 21d, and an icon position registration portion 21e. The selection portion 21a, the acquisition portion 21b, the search portion 21c, the icon generation portion 21d, and the icon position registration portion 21e may be realized by an electric circuit or an arithmetic unit having an electronic device incorporated therein such that a process of each portion is executable.

The selection portion 21a performs a process of selecting a device icon generation process or an employee icon generation process based on an instruction which is inputted from the operation input portion 24 by the arrangement drawing creator.

In the case of the device icon generation process, the acquisition portion 21b performs a process of performing communication with the image forming apparatus 30 or the like to acquire the device ID from the image forming apparatus 30 or the like. In the case of the employee icon generation process, the acquisition portion 21b performs a process of performing communication or the like with the apparatus 40 carried by the employee or the like, to acquire the employee ID.

The search portion 21c performs a process of searching for attribute information of the device (device data, device catalog data) or attribute information of the employee which is stored in the server 10, by using the device ID or employee ID acquired by the acquisition portion 21b.

The icon generation portion 21d performs a process of generating a device icon or an employee icon having a link to the attribute information, on the server 10, which is found by the search portion 21c.

The icon position registration portion 21e performs a process of recognizing a position determined by the arrangement drawing creator moving the device icon or employee icon which is generated and displayed on the screen of the portable apparatus 20, on the layout drawing, and registering the recognized position in the server 10.

[Configuration of Image Forming Apparatus 30]

Figure 7:
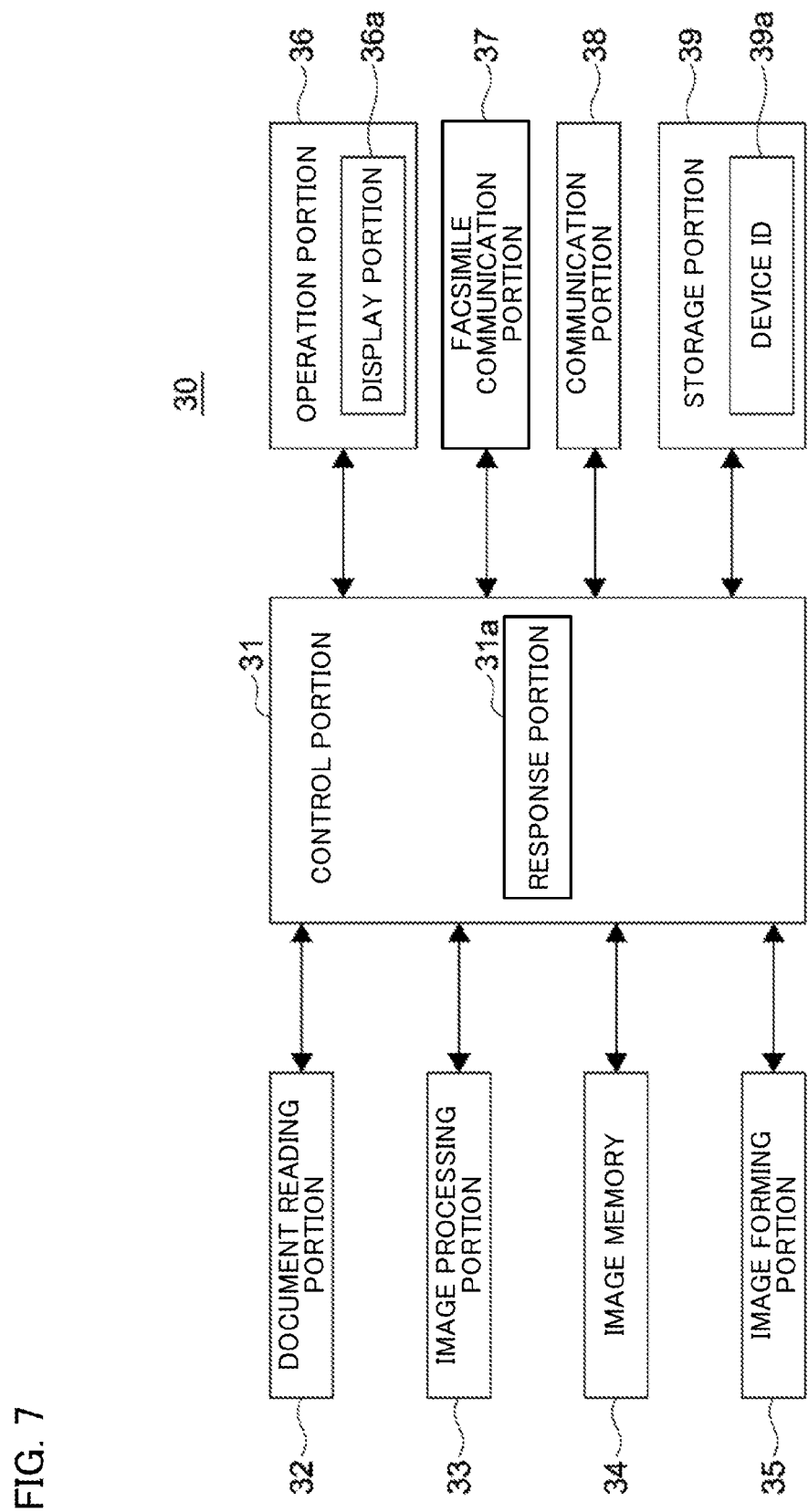
FIG. 7 shows the configuration of an image forming apparatus 30.

Next, the configuration of the image forming apparatus 30 will be described. FIG. 7 shows the configuration of the image forming apparatus 30. Here, among the multiple methods for transferring the device ID from the image forming apparatus 30 to the portable apparatus 20 as described above, the configuration in the case where the image forming apparatus 30 communicates with the portable apparatus 20 to transfer the device ID thereto, will be described.

The image forming apparatus 30 includes a control portion 31. The control portion 31 is a processor including a CPU, a RAM, a ROM, a dedicated hardware circuit, and the like and controls entire operation of the image forming apparatus 30.

The control portion 31 is connected to a document reading portion 32, an image processing portion 33, an image memory 34, an image forming portion 35, an operation portion 36, a facsimile communication portion 37, a communication portion 38, a storage portion 39, and the like. The control portion 31 controls operation of each of the above portions connected thereto, and performs a process of transmitting and receiving signals or data to and from each portion.

The control portion 31 controls a process and drive of a mechanism required for executing operation control for each function such as a scanner function, a print function, a copy function, and a facsimile transmission/reception function based on a job execution instruction inputted from the user through the operation portion 36 or a PC or the like which is connected via a network.

In addition, the control portion 31 includes a response portion 31a. The response portion 31a is a functional block realized by a program, loaded from the ROM or the like into the RAM, being executed by the CPU.

The response portion 31a performs a process of responding to an acquisition request for the device ID of the image forming apparatus 30, which acquisition request is received from the portable apparatus 20 via the communication portion 38, with the device ID. The response portion 31a may be realized by an electric circuit or an arithmetic unit having an electronic device incorporated therein such that the process in the response portion 31a is executable.

The document reading portion 32 includes a control circuit, a reading mechanism, and the like and performs a process of reading an image from a document.

The image processing portion 33 is an image processing circuit which performs image processing as necessary on image data of the image read by the document reading portion 32. For example, after the image read by the document reading portion 32 is formed, the image processing portion 33 performs image processing such as shading compensation in order to improve the quality of the image.

The image memory 34 has an area for temporarily storing data of a document image obtained through reading by the document reading portion 32, and temporarily storing data to be printed by the image forming portion 35.

The image forming portion 35 is a printer which includes a control circuit, an image forming mechanism, and the like and performs a process of forming an image such as image data read by the document reading portion 32.

The operation portion 36 includes a touch panel portion and an operation key portion which accept instructions from the user for various operations and processes which are executable by the image forming apparatus 30. The touch panel portion includes a display portion 36a such as a liquid crystal display (LCD) provided with a touch panel.

The facsimile communication portion 37 is a communication circuit which includes an encoding/decoding portion, a modulation/demodulation portion, and a network control unit (NCU) and performs facsimile transmission by using a public telephone line network.

The communication portion 38 is a communication circuit which performs transmission and reception of various data to and from an apparatus (a PC, etc.) within a local area and performs transmission and reception of data to and from the portable apparatus 20 and the like by using NFC.

The storage portion 39 has a storage area for storing a document image read by the document reading portion 32, and the like and storing a device ID 39a of the image forming apparatus 30. The storage portion 39 is a large-capacity storage unit such as an HDD.

[Configuration of Apparatus 40]

Figure 8:
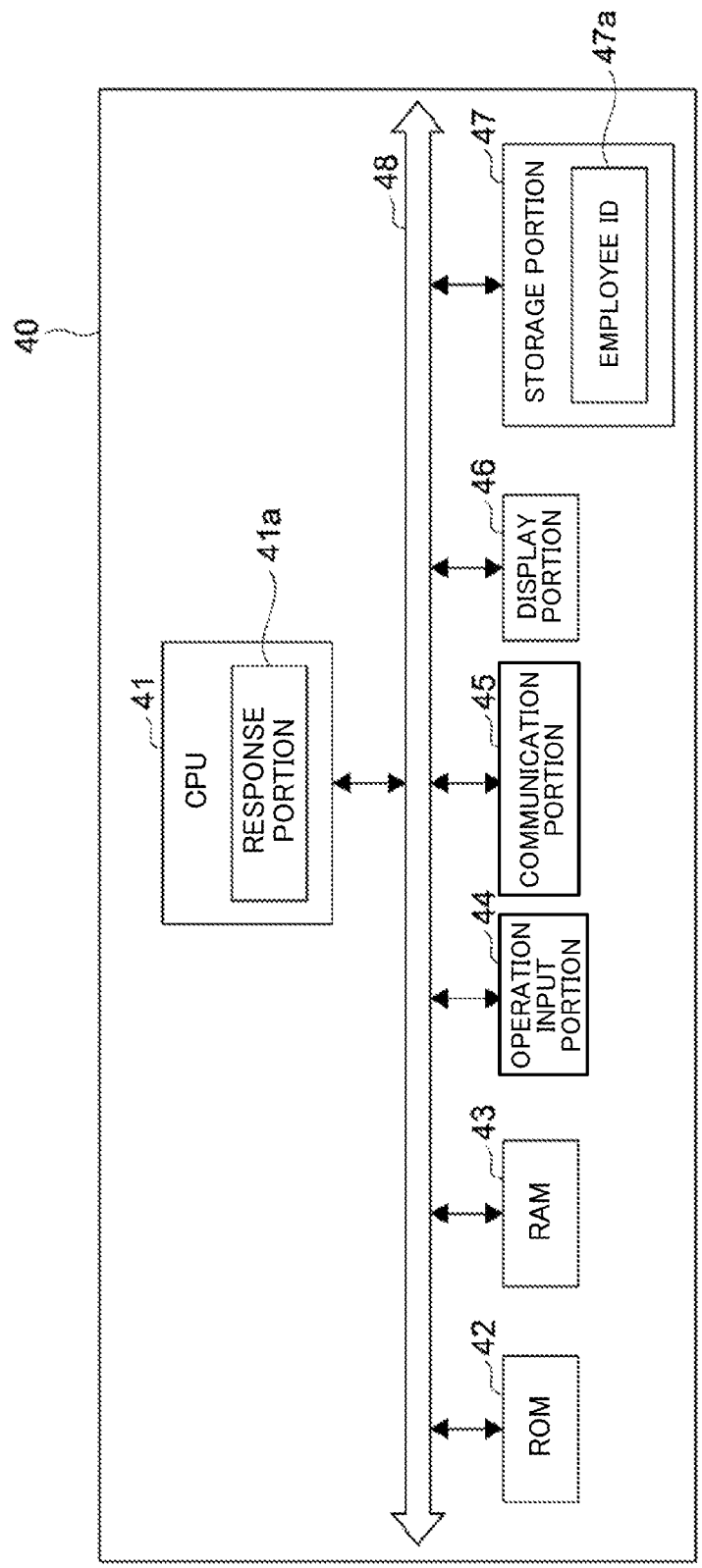
FIG. 8 is a configuration diagram of an apparatus 40.

Next, the configuration of the apparatus 40 which is carried by the employee and which responds with the employee ID of the employee carrying the apparatus 40 when there is a request from the portable apparatus 20, will be described. FIG. 8 shows the configuration of the apparatus 40. Here, among the multiple methods for acquiring the employee ID by the portable apparatus 20 as described above, the configuration in the case where the apparatus 40 carried by the employee communicates with the portable apparatus 20 to transfer the employee ID thereto, will be described.

The apparatus 40 has substantially the same configuration as that of the server 10 or the portable apparatus 20 and includes a CPU 41, a ROM 42, a RAM 43, an operation input portion 44, a communication portion 45, a display portion 46, and a storage portion 47, and they are connected to each other via a bus 48. The apparatus 40 may be any apparatus as long as it is an apparatus that can respond with the employee ID. Here, the configuration in the case of using a computer will be described. Here, only the parts different from the server 10 and the portable apparatus 20 will be described, and the description of the part common to the server 10 and the portable apparatus 20 is omitted.

A response portion 41a is realized by a program executed in the CPU 41. The response portion 41a performs a process of responding to an acquisition request for the employee ID of the employee carrying the apparatus 40, which acquisition request is received from the portable apparatus 20 via the communication portion 45, with an employee ID 47a stored in the storage portion 47. The response portion 41a may be realized by an electric circuit or an arithmetic unit having an electronic device incorporated therein such that the process in the response portion 41a is executable.

[Flow of Process]

Figure 9:
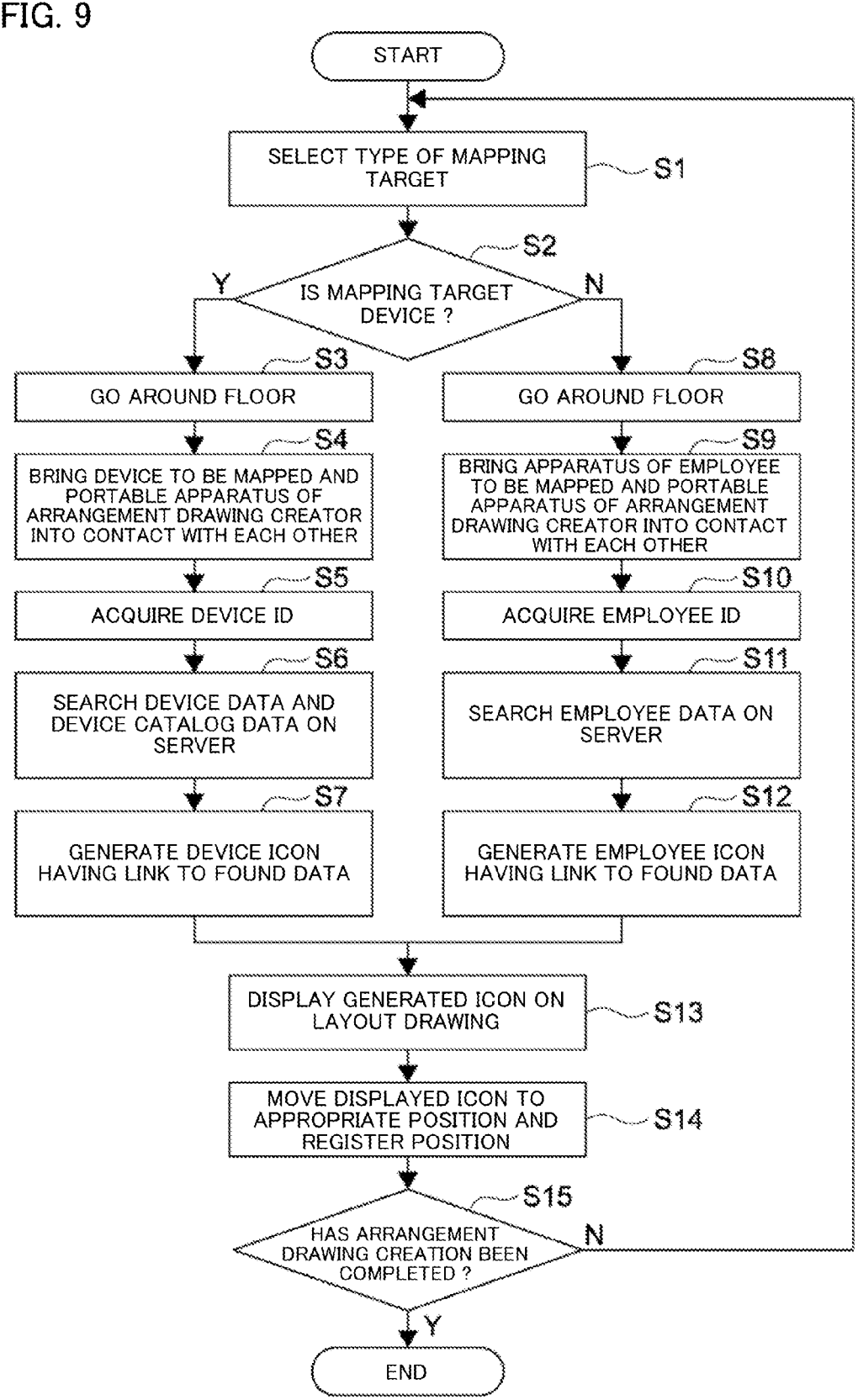
FIG. 9 shows steps of a process in the arrangement drawing creation system 100 according to the embodiment of the present disclosure.

Next, flow of a process in the arrangement drawing creation system 100 according to the embodiment of the present disclosure will be described. A flowchart of FIG. 9 shows steps of the process in the arrangement drawing creation system 100 according to the embodiment of the present disclosure.

First, the selection portion 21a of the portable apparatus 20 accepts, from the arrangement drawing creator via the operation input portion 24, an instruction as to whether to perform an operation of disposing (mapping) a device icon of an apparatus such as the image forming apparatus 30 on an arrangement drawing or perform an operation of disposing an employee icon indicating the position of the seat of an employee (step S1).

Next, the selection portion 21a determines whether the accepted instruction is to map a device icon or an employee icon (step S2).

If the accepted instruction is to map a device icon (Y in step S2), a process of mapping a device icon is performed in the arrangement drawing creation system 100.

The arrangement drawing creator goes around a floor, for which an arrangement drawing is to be created, with the portable apparatus 20 (step S3).

When the arrangement drawing creator encounters the image forming apparatus 30 or the like to be mapped, the arrangement drawing creator puts the portable apparatus 20 over or on the image forming apparatus 30 or the like to cause NFC to be performed (step S4).

Next, the acquisition portion 21b of the portable apparatus 20 acquires, from the image forming apparatus 30 or the like, the device ID 39a of the apparatus (step S5).

Next, the search portion 21c of the portable apparatus 20 cooperates with the search portion 11a of the server 10 to search the device catalog data table 17a and the device data table 17b stored in the storage portion 17 of the server 10, by using the device ID 39a acquired in the previous step (step S6).

Next, the icon generation portion 21d generates a device icon having link information to device catalog data and device data found in the previous step (step S7).

Next, the icon position registration portion 21e displays the device icon generated in the previous step, at a temporary position on the screen of the display portion 26 of the portable apparatus 20 such that the device icon is superimposed on a layout drawing (step S13).

Next, the arrangement drawing creator moves the position of the device icon displayed on the screen to an appropriate position on the layout drawing by a drag operation or the like. The icon position registration portion 21e recognizes the position of the device icon determined by the arrangement drawing creator, and cooperates with the icon position registration portion 11b on the server 10 to store position information of the recognized position as the arrangement drawing data 17e into the storage portion 17 of the server 10 (step S14).

Next, the CPU 11 determines whether the arrangement drawing creation process has been completed, based on an input or the like from the arrangement drawing creator (step S15).

If the arrangement drawing creation has not been completed (N in step S15), the CPU 11 returns to step S1 to repeat the process.

If the arrangement drawing creation has been completed (Y in step S15), the CPU 11 ends the process.

If the instruction accepted in step S2 is to map an employee icon (N in step S2), a process of mapping an employee icon is performed in the arrangement drawing creation system 100.

The arrangement drawing creator goes around the floor, for which an arrangement drawing is to be created, with the portable apparatus 20 (step S8).

When the arrangement drawing creator encounters an employee to be mapped, the arrangement drawing creator puts the portable apparatus 20 over or on the apparatus 40 carried by the employee, to cause NFC to be performed (step S9).

Next, the acquisition portion 21b of the portable apparatus 20 acquires, from the apparatus 40, the employee ID 47a of the employee carrying the apparatus 40 (step S10).

Next, the search portion 21c of the portable apparatus 20 cooperates with the search portion 11a of the server 10 to search the employee data table 17c stored in the storage portion 17 of the server 10, by using the employee ID 47a acquired in the previous step (step S11).

Next, the icon generation portion 21d generates an employee icon having link information to employee data found in the previous step (step S12).

Processes after the employee icon is generated are the same as those when the device icon is generated, and thus the description thereof is omitted.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An arrangement drawing creation system comprising: a portable apparatus carried by an arrangement drawing creator; and a server capable of communicating with the portable apparatus by wireless, wherein
the portable apparatus includes:
a first communication processing portion performs a communication process with the server and a target apparatus whose installation position is to be described in a specific area on an arrangement drawing;
an acquisition processing portion performs a process of acquiring, from the target apparatus via the first communication processing portion, a device ID with which the target apparatus is uniquely identified;
an icon generation processing portion performs a process of generating a device icon having the acquired device ID;
a display processing portion performs a process of displaying the generated device icon such that the device icon is superimposed on a layout drawing of an already-existing object, the layout drawing being acquired from the server;
an operation input processing portion performs a process of accepting, from the arrangement drawing creator, an instruction of moving a position of the device icon on the displayed layout drawing; and
a first icon position registration processing portion performs a process of changing the position of the device icon on the layout drawing based on the accepted instruction, and performs a process of issuing an instruction of registering the changed position of the device icon in the server, and
the server includes:
a second communication processing portion performs a communication process with the portable apparatus;
a storage portion having a storage area for storing the layout drawing and the arrangement drawing; and
a second icon position registration processing portion performs a process of registering the changed position of the device icon in the arrangement drawing, based on the instruction from the first icon position registration processing portion of the portable apparatus.

2. The arrangement drawing creation system according to claim 1, wherein
the storage portion of the server further has attribute data of the target apparatus stored therein,
the portable apparatus further includes a first search processing portion performs a process of issuing an instruction of searching for the attribute data by using the acquired device ID,
the server further includes a second search processing portion configured to search for the attribute data based on the instruction from the first search processing portion of the portable apparatus and return a search result to the first search processing portion, and
the icon generation processing portion of the portable apparatus generates the device icon having link information to the found attribute data based on the search result.

3. The arrangement drawing creation system according to claim 1, wherein the first communication processing portion acquires the device ID from the target apparatus via near field communication.

4. The arrangement drawing creation system according to claim 1, wherein
the portable apparatus is carried by the arrangement drawing creator in order to create an arrangement drawing in which a seat position of an employee is described in the specific area,
the first communication processing portion is capable of communicating with an apparatus possessed by the employee,
the acquisition processing portion acquires, from the apparatus possessed by the employee via the first communication processing portion, an employee ID with which the employee is uniquely identified,
the icon generation processing portion generates an employee icon having the acquired employee ID,
the display processing portion displays the generated employee icon such that the employee icon is superimposed on the layout drawing acquired from the server,
the operation input processing portion accepts, from the arrangement drawing creator, an instruction of moving a position of the employee icon on the displayed layout drawing,
the first icon position registration processing portion changes the position of the employee icon on the layout drawing based on the accepted instruction, and issues an instruction of registering the changed position of the employee icon in the server, and
the second icon position registration processing portion of the server registers the changed position of the employee icon in the arrangement drawing based on the instruction from the first icon position registration processing portion of the portable apparatus.

5. An arrangement drawing creation apparatus carried by an arrangement drawing creator, the arrangement drawing creation apparatus comprising:
a communication processing portion performs a communication process with a target apparatus whose installation position is to be described in a specific area on an arrangement drawing;
a storage portion having a storage area for storing a layout drawing of an already-existing object and the arrangement drawing;
an acquisition processing portion performs a process of acquiring, from the target apparatus via the communication processing portion, a device ID with which the target apparatus is uniquely identified;
an icon generation processing portion performs a process of generating a device icon having the acquired device ID;
a display processing portion performs a process of displaying the generated device icon such that the device icon is superimposed on the layout drawing;
an operation input processing portion performs a process of accepting, from the arrangement drawing creator, an instruction of moving a position of the device icon on the displayed layout drawing; and
an icon position registration processing portion performs a process of changing the position of the device icon on the layout drawing based on the accepted instruction, and performs a process of registering the changed position of the device icon in the arrangement drawing.

6. A non-transitory computer-readable storage medium having stored therein an arrangement drawing creation program executable by a computer of a portable apparatus carried by an arrangement drawing creator, the arrangement drawing creation program causing the computer to execute:
a procedure of acquiring, from a target apparatus whose installation position is to be described in a specific area on an arrangement drawing, via a first communication processing portion, a device ID with which the target apparatus is uniquely identified;
a procedure of generating a device icon having the acquired device ID;
a procedure of displaying the generated device icon such that the device icon is superimposed on a layout drawing of an already-existing object;
a procedure of accepting, from the arrangement drawing creator, an instruction of moving a position of the device icon on the displayed layout drawing; and
a procedure of performing a process of changing the position of the device icon on the layout drawing, based on the accepted instruction, and issuing an instruction of registering the changed position of the device icon in a server.

* * * * *